May 5, 1931.                    E. R. SAGE                    1,803,810
                              JACK STANCHION
                            Filed July 31, 1928
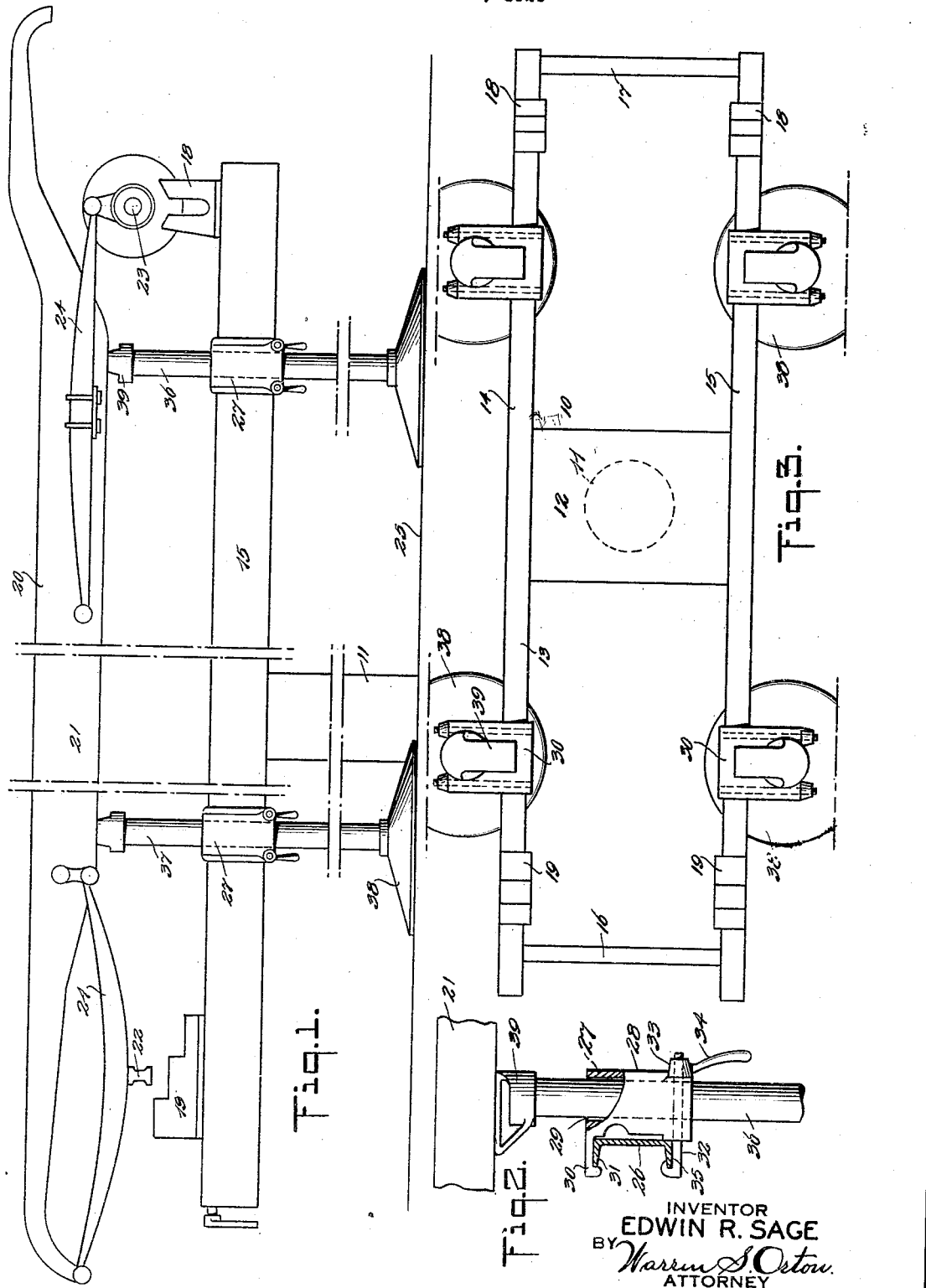
INVENTOR
EDWIN R. SAGE
BY Warren S. Orton
ATTORNEY Patented May 5, 1931

1,803,810

UNITED STATES PATENT OFFICE

EDWIN R. SAGE, OF JERSEY CITY, NEW JERSEY

JACK STANCHION

Application filed July 31, 1928. Serial No. 296,620.

The invention relates to a lifting mechanism for supporting a vehicle in elevated position while the same is being repaired or lubricated.

It is desirable during the process of working on vehicles such as for instance while making repairs on the same, to support the vehicle in such way that the normal load tension is removed from the springs and the vehicle wheels free so that they may be rotated or withdrawn from their axles while the spring supported parts of the car are fixedly supported from the ground. The different makes of cars, of course, have differently spaced axles, chassis and other parts normally engaged by lifting mechanism of the character under discussion.

Accordingly, the primary object of the invention is to provide a simplified form of vehicle lifting mechanism by means of which any of the standard makes of vehicles may be engaged at some structurally rigid part, elevated at the requisite distance from the ground or other support, so as to position the supported part in firm engagement from the ground irrespective of irregularities in level of the ground while leaving other parts such as the running gear in suspended or unsupported position in order to facilitate removal of the running gear and the like.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Fig. 1 is a view in side elevation of a preferred embodiment of the invention showing the same in position supporting a vehicle, parts of which are shown in outline;

Fig. 2 is a detail view showing the upper part of one of the stanchions shown in Fig. 1 and looking at the same from the side of the showing in this figure; and Fig. 3 is a plan view looking down upon the structure shown in Fig. 1 with the vehicle parts omitted.

In the drawings, there is shown part of a vehicle lifting mechanism 10 of any conventional type including the design of such lifts which are intended to have rotary movement about a central vertical axis as well as the usual vertical movement. This mechanism includes a lifting plunger 11 provided with a head 12 which is centrally positioned within a horizontally disposed frame 13. This frame includes longitudinally extending side sills 14 and 15.

The side sills 14 and 15 are connected at opposite ends by end sills 16 and 17. Each of the sills 14 and 15 is provided with axle engaging members for engaging the axle or other portion of the running gear of the vehicle. For the purpose of this disclosure, there is illustrated a pair of axle engaging dogs 18 for engaging the front axle and a pair of transversely aligned stepped shoulders 19 for engaging the rear axle of different length cars but in actual practice the axle engaging members illustrated in the drawing will be used.

Referring to the vehicle 20 there is illustrated one of the chassis frames 21 which will symbolically represent any rugged spring supported part of the vehicle. There is also illustrated a rear axle 22 and front axle 23 suspended conventionally from the chassis by means of springs 24. The device thus far described may be regarded as any conventional vehicle lifting mechanism for elevating the vehicle as a whole from the ground.

Slidably mounted on each of the side sills 14 and 15 are a pair of stanchions cooperatively designed to support the vehicle or a part thereof from the ground 25 independent of any support which may be provided by the lifting mechanism. As the stanchions are of similar construction, the detailed description of any one will equally apply to the other. Referring specifically to Fig. 2, it will be noted that the side sills are channel shaped as shown at 26. Slidably mounted on the side sill is a bracket 27 comprising an upstanding body portion 28 through which extends vertically a bore 29.

The upper portion of the bracket is provided with a finger plate 30 designed to overhang the upper flange 31 of the side sill shown at 26. It is intended that the brackets 27 be free to move longitudinally along their respective sills so as to be easily positioned beneath the chassis 21 or other spring supported part of the vehicle with which it is intended to engage. The brackets are secured in their adjusted position on the side sills by means of a pair of hooked bolts 32, the nut 33 of which is provided with a handle 34 to facilitate easy loosening and tightening of the bolts in engagement with the lower flange 35 of the side sill 26. Positioned in the bore 29 is the cylindrical column 36 of the associated stanchion 37 and which stanchion is defined at its lower end by a wide spreading base 38 designed to provide an extensive engagement with the floor 25. The upper end of the column 36 is provided with a shoe designed to provide an extensive engagement with the underside of the chassis or other spring supported part 21.

In operation and assuming that the bracket 27 is loose on the lifting mechanism the vehicle is driven conventionally until the axles are in proper position to be engaged by the axle engaging members 18 and 19 when the mechanism functions to elevate the vehicle. The brackets are then slid along the side sills of the lifting frame until they are properly located beneath the spring supported parts of the vehicle which they are intended to engage. The lifting device is then slightly lowered from its elevated position and until the spring supported part 21 rests on the located shoes 39.

It is understood from this construction that the weight of the spring supported parts is transferred through the four stanchions and the broad bases of the stanchions provide an extensive area of support for the vehicle. The elevating mechanism may then be lowered slightly into the position such as is indicated in Fig. 1 to drop the axle traction wheels and other associated parts of running gear thus relieving tension on the springs 24. In this position, work may be performed on the vehicle and at this time the weight of the vehicle as a whole is divided between the lifting mechanism and the four stanchions. Should it be desired, the lifting mechanism may be lowered still further and until the traction wheels are in light contact with the ground in which position the wheels may be removed and replaced without elevating them.

It is possible with this construction to utilize the stanchions, especially when functioning to support the vehicle, as means for securing the lifting mechanism against rotation and in this way the initial relations of the supported parts are maintained.

Claims:

1. In a device of the class described, the combination of a vehicle lifting mechanism including a horizontally disposed frame including a sill and also provided with means for engaging one of the axles of the vehicle, said sill provided with a bracket slidably mounted thereon and provided with means for securing the bracket in adjusted position on the sill, said bracket provided with a vertically extending bore and a stanchion supported from the ground, extending through said bracket and located thereby to set its upper vehicle supporting end in preset relation to the frame and to the vehicle axle supported thereon.

2. In a device of the class described, the combination of a vehicle lifting mechanism including a frame provided with means for supporting the running gear of a vehicle, stanchions for supporting the spring supported parts of the vehicle from the ground and brackets for securing the stanchions to the frame and for locating the stanchions in set position relative to the frame.

3. In a device of the class described, the combination of a vehicle lifting mechanism including a frame provided with means for supporting the running gear of a vehicle, stanchions for supporting the spring supported parts of the vehicle from the ground, brackets for securing the stanchions to the frame and for locating the stanchions in set position relative to the frame, and means for locking the brackets to the frame thereby to secure the stanchions in set position.

4. In a device of the class described, the combination of a ground supported stanchion provided with means for engaging part of a vehicle, and a vehicle lifting mechanism having a part thereof slidably mounted for vertical movement on said stanchion and restrained thereby from movement in all other directions.

Signed at New York in the county of New York and State of New York, this 15th day of June A. D. 1928.

EDWIN R. SAGE.